(12) United States Patent
Morimura

(10) Patent No.: US 12,472,777 B2
(45) Date of Patent: Nov. 18, 2025

(54) MOTORCYCLE TIRE

(71) Applicant: SUMITOMO RUBBER INDUSTRIES, LTD., Hyogo (JP)

(72) Inventor: Ryosuke Morimura, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/889,579

(22) Filed: Sep. 19, 2024

(65) Prior Publication Data

US 2025/0121632 A1 Apr. 17, 2025

(30) Foreign Application Priority Data

Oct. 16, 2023 (JP) .................................. 2023-178407

(51) Int. Cl.
*B60C 11/04* (2006.01)
*B60C 1/00* (2006.01)
*B60C 11/03* (2006.01)

(52) U.S. Cl.
CPC .......... *B60C 11/033* (2013.01); *B60C 1/0016* (2013.01); *B60C 11/04* (2013.01); *B60C 2200/10* (2013.01)

(58) Field of Classification Search
CPC .............. B60C 1/0016; B60C 11/0058; B60C 11/04; B60C 11/033
See application file for complete search history.

(56) References Cited

U.S. PATENT DOCUMENTS

| 4,385,653 A | * | 5/1983 | Okazaki | B60C 11/18 |
| | | | | 152/549 |
| 5,237,015 A | * | 8/1993 | Urban | C08F 285/00 |
| | | | | 525/902 |
| 10,173,473 B2 | | 1/2019 | Otani et al. | |
| 10,202,005 B2 | * | 2/2019 | Shimizu | B60C 11/03 |
| 2016/0221399 A1 | | 8/2016 | Otani et al. | |

FOREIGN PATENT DOCUMENTS

| CN | 108928190 | * | 5/2022 |
| EP | 2186653 B1 | | 10/2012 |
| EP | 2662226 B1 | | 3/2016 |
| EP | 3050721 A1 | | 8/2016 |
| EP | 3705314 A1 | | 9/2020 |
| JP | 2016-141226 A | | 8/2016 |
| JP | 2023023227 | * | 2/2023 |
| KR | 102528226 | * | 5/2023 |

OTHER PUBLICATIONS

Extended European Search Report in counterpart European Application No. EP24199841.8, dated Mar. 12, 2025.

* cited by examiner

*Primary Examiner* — Justin R Fischer
(74) *Attorney, Agent, or Firm* — Greenblum & Bernstein, P.L.C.

(57) ABSTRACT

A motorcycle tire comprises a tread portion having a first tread edge, a second tread edge and a ground contacting surface. The ground contacting surface comprises a first ground contacting surface from the tire equator to the first tread edge. When the first ground contacting surface is equally axially divided into a first, a second, a third, a fourth and a fifth zone in order from the tire equator to the first tread edge, a land ratio of the second zone is larger than a land ratio of the first zone and larger than a land ratio of the third zone.

18 Claims, 5 Drawing Sheets

MOTORCYCLE TIRE

TECHNICAL FIELD

The present disclosure relates to a motorcycle tire.

BACKGROUND ART

Patent Document 1 listed below discloses a pneumatic tire for motorcycles, in which a land ratio of each zone of the tread portion is specified.

In this tire, a range in the tire axial direction of the tread portion from the tire equator to each tread edge is divided equally into five zones, and the land ratios of the first to fifth zones are specifically defined.

By having the above-described feature, the tire is expected to be provided with improved response behavior on wet road surfaces, and improved transient characteristics such as grip performance when initiating turning, and the like.

PRIOR ART DOCUMENT

Patent Document

Patent Document 1: Japanese Patent Application Publication No. 2016-141226

SUMMARY OF THE INVENTION

Problems to be Solved by the Invention

In the tire disclosed in Patent Document 1, when running straight (when running at a camber angle of 0 degrees), edges in the tire axial direction of the ground contacting area or patch tend to locate in the vicinities of the second zones. As a result, so-called step wear is liable to occur near the edges of the above-mentioned ground contacting area, therefore, there is a need for improvement.

The present disclosure was made in view of the above-mentioned circumstances, and a primary objective of the present disclosure is to provide a motorcycle tire in which the above-mentioned step wear in the tread portion can be suppressed.

Means for Solving the Problems

According to the present disclosure, a motorcycle tire comprises:
a tread portion having a first tread edge, a second tread edge and a ground contacting surface between the first tread edge and the second tread edge, the ground contacting surface including a first ground contacting surface between the tire equator and the first tread edge,
wherein
when the developed width of the first ground contacting surface is equally divided into five zones which are a first zone, a second zone, a third zone, a fourth zone and a fifth zone located in order from the tire equator to the first tread edge,
a land ratio La2 of the second zone is larger than a land ratio La1 of the first zone, and larger than a land ratio La3 of the third zone.

Effects of the Invention

In the motorcycle tire according to the present disclosure, since the above-described configuration is employed, the step wear of the tread portion can be suppressed.

DETAILED DESCRIPTION OF THE INVENTION

Hereinafter, an embodiment of the present disclosure will be described in detail in conjunction with accompanying drawings.

Although the drawings illustrate features of the embodiment, the illustrated features may contain exaggeration different from the actual dimensional relationship for easy understanding.

Figure 1:
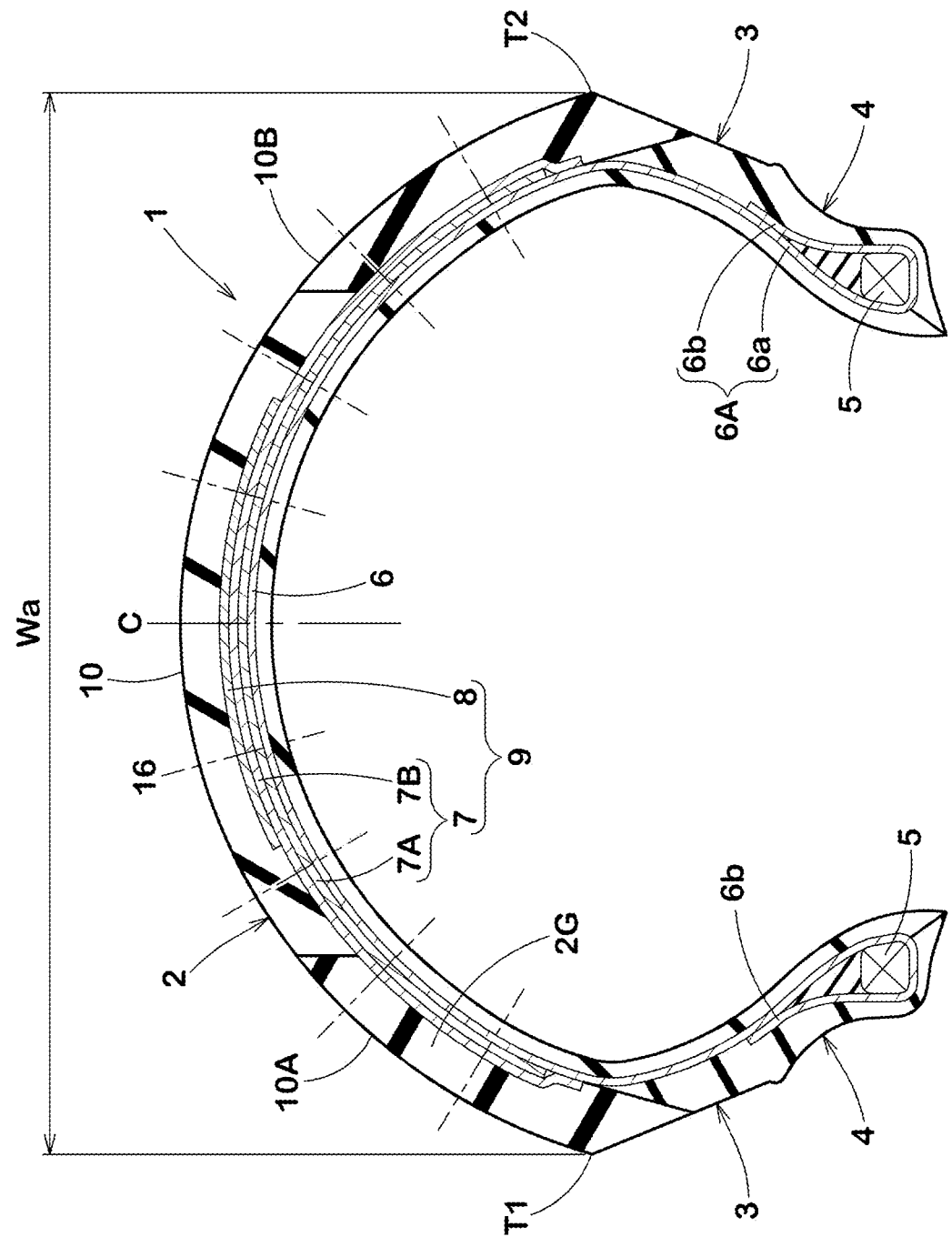
FIG. 1 is a cross-sectional view of a motorcycle tire as an embodiment of the present disclosure.

FIG. 1 is a cross-sectional view of a motorcycle tire 1 of the present embodiment showing a tire meridian cross section including a tire rotational axis under a standard state of the tire 1.

In the present embodiment, the tire 1 is for the front wheel of a motorcycle suitable for on-road sports driving. The size of the tire 1 is, for example, 120/70ZR17.

However, the present disclosure is not limited to such tire.

In the case that the tire 1 is a type of pneumatic tire for which various standards have been established, the "standard state" means a state of the tire when mounted on a standard wheel rim, and inflated to a standard tire pressure, but loaded with no tire load.

In the case that the tire 1 is a tire for which various standards are not yet established, the "standard state" means a standard usage state depending on the purpose of use of the tire and in a condition in which the tire is not attached to a vehicle and no tire load is applied, In this application including specification and claims, dimensions and positions of each part or portion of the tire refer to those under the standard state unless otherwise noted.

Incidentally, even if the dimensions or positions cannot be measured directly under the standard state, for example, in the case of internal tire components, these can be measured using x-ray equipment etc.

The "standard wheel rim" is a wheel rim specified for the tire in a standard system including standards on which the tire is based, for example, the "Standard rim" in JATMA, "Design Rim" in TRA, "Measuring Rim" in ETRTO.

The "standard tire pressure" is the air pressure specified for the tire in a standard system including standards on which the tire is based, for example, the "maximum air pressure" in JATMA, "INFLATION PRESSURE" in ETRTO, and the maximum air pressure listed in the table "TIRE LOAD LIMITS AT VARIOUS COLD INFLATION PRESSURES" in TRA.

As shown in FIG. 1, the tire 1 in the present embodiment comprises a tread portion 2, a pair of sidewall portions 3, and a pair of bead portions 4.

The sidewall portions 3 are respectively connected to both sides in the tire axial direction of the tread portion 2.

The bead portions 4 are respectively connected to inner sides in the tire radial direction of the respective sidewall portions 3. In each bead portion 4, a bead core 5 is embedded.

The tire 1 comprises a carcass 6 extending between the paired bead portions 4. The carcass 6 comprises, for example, a carcass ply 6A comprising a plurality of carcass cords.

The carcass cords (not shown) are arranged at an angle from 65 to 90 degrees with respect to the tire circumferential direction, for example.

The carcass 6 in the present embodiment is composed of only one carcass ply 6A, but, it may be composed of a plurality of overlaid carcass plies.

The carcass ply 6A comprises a main portion 6a and turnup portions 6b.

The main portion 6a extends from the tread portion 2 through the sidewall portions 3 on both sides to the bead cores 5 of the bead portions 4 on both sides.

The turnup portions 6b are continuous with the main portion 6a, and are each folded back around the bead core 5 from the inside to the outside in the tire axial direction.

The tread portion 2 comprises a tread reinforcing layer 9 disposed outside the carcass 6 in the tire radial direction, and a tread rubber 2G disposed outside the tread reinforcing layer 9 in the tire radial direction.

The tread reinforcing layer 9 includes a belt layer 7 and a band layer 8 disposed outside the belt layer 7 in the tire radial direction.

The belt layer 7 is disposed adjacently to the outer side in the tire radial direction of the carcass 6. The belt layer 7 is arranged so as to reinforce a substantially entire width in the tire axial direction of the tread portion 2.

The belt layer 7 is composed of, for example, two belt plies 7A and 7B. Each of the belt plies 7A and 7B is composed of rubberized belt cords arranged at an angle in a range from of 10 to 40 degrees with respect to the tire circumferential direction.

The band layer 8 is arranged, for example, in a center part in the tire axial direction of the tread portion 2, and extends across the tire equator C.

The band layer 8 comprises, for example, at least one band cord wound helically in the tire circumferential direction in order to suppress growth of the outer diameter of the tread portion 2 during high-speed running.

The tread portion 2 has a first tread edge T1, a second tread edge T2 and a ground contacting surface 10 between the first tread edge T1 and the second tread edge T2.

Here, the ground contacting surface 10 refers to the entire radial outer surface of the tread portion 2 that may come into contact with the ground when running straight or turning.

In the tire meridian cross section, the ground contacting surface 10 is curved in an arc shape being convex outwardly in the tire radial direction so that a sufficient ground contacting area can be secured even when turning with a large camber angle or cornering with a large motorcycle lean angle.

The first tread edge T1 and the second tread edge T2 correspond to the axially outermost ends of the ground contacting surface 10 which can come into contact with the road surface at the maximum camber angle.

The tread width Wa is the distance in the tire axial direction from the first tread edge T1 to the second tread edge T2.

In the present embodiment, since the ground contacting surface 10 is curved as described above, the tread width Wa corresponds to the maximum cross-section width of the tire.

Figure 2:
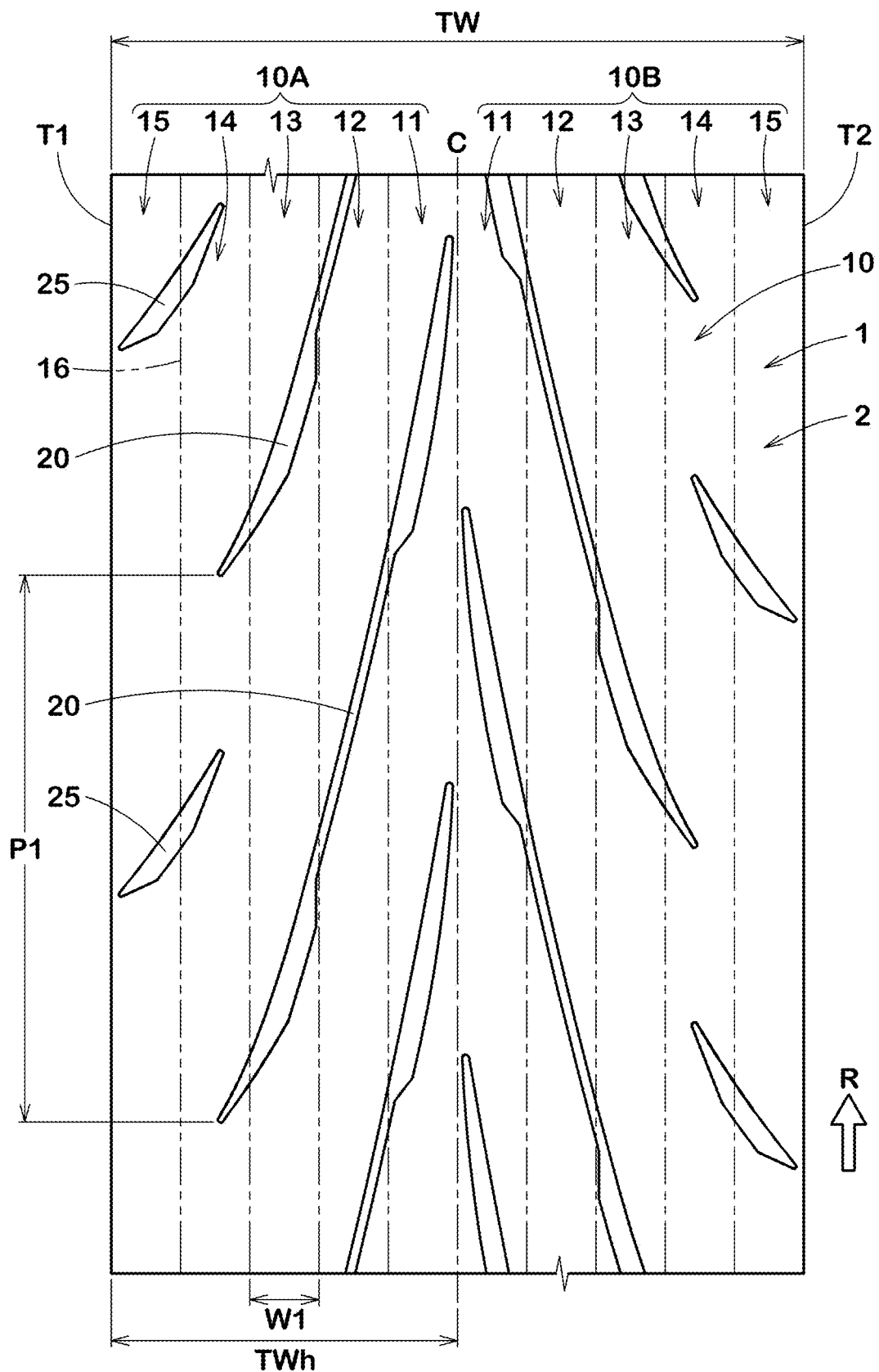
FIG. 2 is a developed view of a part of the ground contacting surface of the tread portion shown in FIG. 1.

FIG. 2 is a developed partial view of the ground contacting surface 10 of the tread portion 2. Specifically, FIG. 2 shows a part in the tire circumferential direction of the ground contacting surface 10 which is developed in a plane.

In this specification, the width in the tire axial direction of each part of the tread portion in this developed state is referred to as the developed width.

Further, in this specification, the developed width from the first tread edge T1 to the second tread edge T2 is referred to as the developed tread width TW.

Furthermore, the developed width from the tire equator C to the first tread edge T1 and that from the tire equator C to the second tread edge T2 are each referred to as the half developed tread width TWh.

In this embodiment, as shown in FIG. 2, the tread portion 2 is provided with a unidirectional tread pattern for which an intended rotational direction R of the tire is specified to maximize tire performance.

The intended rotational direction R may be indicated by letters or symbols, e.g. arrows which are formed, for example, in the sidewall portion 3 or the tread portion 2. However, the present disclosure is not limited to such a unidirectional tread pattern.

In the drawings, the intended rotational direction R is indicated by an outline arrow.

In the ground contacting surface 10, a part from the tire equator C to the first tread edge T1 is referred to as the first ground contacting surface 10A, and a part from the tire equator C to the second tread edge T2 is referred to as the second ground contacting surface 10B.

In this embodiment, the first ground contacting surface 10A and the second ground contacting surface 10B have substantially same symmetrical configurations except that tread pattern components on one side of the tire equator are circumferentially shifted from those on the other side.

In the present disclosure, the first ground contacting surface 10A is divided equally in the developed width direction of the first ground contacting surface 10A into five zones which are a first zone 11, a second zone 12, a third zone 13, a fourth zone 14 and a fifth zone 15 in order from the tire equator C to the first tread edge T1.

In the same way, the second ground contacting surface 10B is divided into a first zone 11, a second zone 12, a third zone 13, a fourth zone 14 and a fifth zone 15 in order from the tire equator C to the second tread edge T2.

Accordingly, the developed width W1 of each of these zones is 20% of the half tread developed width TWh.

In the first ground contacting surface 10A, the first zone 11 is located closest to the tire equator C; the second zone 12 is adjacent to the first zone 11 on the first tread edge T1 side; the third zone 13 is adjacent to the second zone 12 on the first tread edge T1 side; the fourth zone 14 is adjacent to the third zone 13 on the first tread edge T1 side; and the fifth zone 15 is adjacent to the fourth zone 14 on the first tread edge T1 side, and is located closest to the first tread edge T1. The second ground contacting surface 10B is also similar. That is, the above description can also be applied by replacing "first tread edge T1" with "second tread edge T2", so the description is omitted.

In the drawings, the boundaries 16 of these zones are indicated by dash-dot lines.

In the tire 1 according to the present disclosure, the land ratio of each zone is specified.

Here, the "land ratio" of a zone means a ratio Sb/Sa of the actual ground contact area Sb of the zone to the overall ground contact area Sa of the zone assuming there are no voids (grooves, recesses, sipes and the likes) at all.

In the present disclosure, the land ratio La2 of the second zone 12 is set to be larger than the land ratio La1 of the first zone 11 and larger than the land ratio La3 of the third zone 13.

This can be applied to both the first ground contacting surface 10A and the second ground contacting surface 10B. Thereby, the step wear of the tread portion 2 can be suppressed. The reason is as follows.

Figure 3:
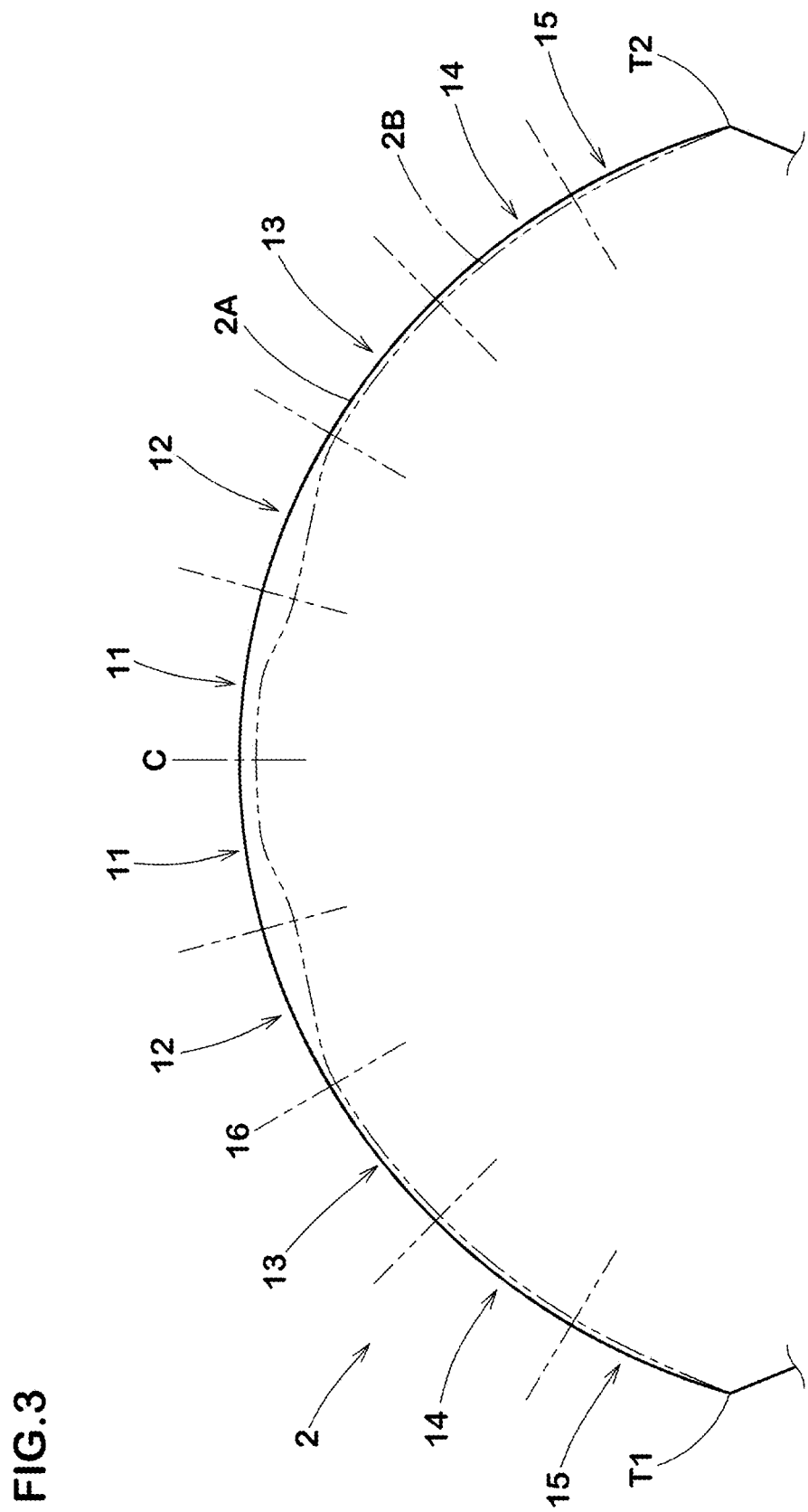
FIG. 3 is a diagram showing the profile of the tread portion.

FIG. 3 is a diagram conceptually showing changes in the profile of the tread portion 2.

In FIG. 3, a solid line indicates a profile 2A of the tread portion 2 when not worn, and a two-dot chain line indicates a profile 2B of the tread portion 2 when tread wear has progressed to some extent.

In this figure, however, the degree of wear is somewhat exaggerated for easy understanding.

Since the profile of the tread portion 2 of the motorcycle tire is curved in an arc shape as shown in FIG. 3, the tread portion 2 tends to wear easily in the vicinity of the tire equator C.

On the other hand, when the motorcycle is running straight or when running at a camber angle of 0 degrees in substance, the edges in the tire axial direction of the ground contact patch are located near the second zones 12 of the tread portion 2.

As a result, the so-called step wear tends to occur in the vicinities of the second zones 12.

In the present disclosure, since the land ratio La2 of the second zones 12 where step wear is likely to occur is made to be larger than the land ratios of the adjacent first zone 11 and third zone 13, the progressions of wear in these respective regions become uniform. Therefore, in the tire 1 according to the present disclosure, the step wear of the tread portion 2 can be effectively prevented.

The features described below for the first ground contacting surface 10A can also be applied to the second ground contacting surface 10B. Therefore, if the descriptions are made for only the first ground contacting surface 10A, since such descriptions can be applied to the second ground contacting surface 10B, those of the second ground contacting surface 10B will be omitted.

Hereinafter, more detail of features of the motorcycle tire 1 according to the present embodiment will be explained. The features described below are optional in the present disclosure, but preferable in the present embodiment.

The land ratio La1 of the first zone 11 is, for example, 81% to 91%, preferably 84% to 88%.

Preferably, the land ratio La1 of the first zone 11 is smaller than the land ratio La2 of the second zone 12 by 8 to 12 percentage points.

Further, the first zone 11 has the smallest land ratio among the five zones 11 to 15. Thereby, wet performance during straight running can be improved while achieving the above-described effects.

The land ratio La2 of the second zone 12 is, for example, 91% to 97%, preferably 93% to 95%.

Further, in the present embodiment, it is preferable that the second zone has the largest land ratio among the five zones 11 to 15.

Thereby, the step wear of the tread portion 2 can be surely suppressed.

The land ratio La3 of the third zone 13 is, for example, 83% to 93%, preferably 86% to 90%.

Preferably, the land ratio La3 of the third zone 13 is smaller than the land ratio La2 of the second zone 12 by 4 to 8 percentage points.

Further, the land ratio La3 of the third zone 13 is preferably larger than the land ratio La1 of the first zone 11. Specifically, it is preferable that the land ratio La3 is larger than the land ratio La1 by 2 to 6 percentage points.

Thereby, when turning at a relatively small camber angle where up to the third zone 13 comes into contact with the ground, the transient characteristic with respect to the response when leaning the motorcycle become linear. Hereinafter, such effect will be sometimes expressed simply as "the transient characteristic when turning is improved".

The land ratio La4 of the fourth zone 14 is, for example, 89% to 93%.

Preferably, the land ratio La4 of the fourth zone 14 is larger than the land ratio La3 of the third zone 13. Specifically, it is preferable that the land ratio La4 is larger than the land ratio La3 by 1 to 3 percentage points.

Thereby, the transient characteristic when turning may be further improved.

The land ratio La5 of the fifth zone 15 is, for example, 91% to 95%.

Preferably, the land ratio La5 of the fifth zone 15 is larger than the land ratio La4 of the fourth zone 14. Specifically, it is preferable that the land ratio La5 is larger than the land ratio La4 by 2 to 6 percentage points.

Thereby, during cornering at the maximum camber angle, excellent cornering performance can be exerted.

Further, it is preferable for the tire 1 in the present embodiment that the land ratios La1 to La5 of the first to fifth zones satisfy the following condition (1) in order to further improve the transient characteristics during turning:

$$La2 > La5 > La4 > La3 > La1 \quad (1)$$

In the tread portion 2 of the present embodiment, in order to achieve the above-mentioned land ratio relationship, the first ground contacting surface 10A is provided with a plurality of main oblique grooves 20 and a plurality of auxiliary oblique grooves 25 which are arranged in the tire circumferential direction as shown in FIG. 2.

However, tires according to the present disclosure are not to be limited to the tread pattern shown in FIG. 2.

In the first ground contacting surface 10A, the main oblique grooves 20 are arranged circumferentially of the tire at a circumferential pitch length P1 (namely, the circumferential distance between every two of the adjacent main oblique grooves 20) which is, for example, in a range from 70% to 90% of the developed tread width TW.

Further, the auxiliary oblique grooves 25 are also arranged in the same manner, namely, at the circumferential pitch length P1.

It is preferable that, in the developed view of the tread portion 2 as shown in FIG. 2, a region which is formed by virtually moving in parallel one main oblique groove 20 toward the first tread edge T1, overlaps with another main oblique groove 20 adjacent to the above-said one main oblique groove 20 on one side in the tire circumferential direction (e.g. the upper side in FIG. 2).

In the present embodiment, the main oblique grooves 20 disposed in each of the first and second ground contacting surfaces 10A and 10B are arranged over the entire circumference of the tire while satisfying the above-described positional relationship.

In other words, the circumferential extents of every two of the circumferentially adjacent main oblique grooves 20 are overlapped with each other in the tire circumferential direction.

Thereby, uneven wear of the tread portion 2 can be suppressed, and the transient characteristics during turning can also be improved.

Further, it is preferable that a region which is formed by virtually moving in parallel one main oblique groove 20 toward the first tread edge T1 overlaps with two of the auxiliary oblique grooves 25.

In other words, the circumferential extent of each of the main oblique grooves 20 overlaps in the tire circumferential direction with the circumferential extents of two of the circumferentially adjacent auxiliary oblique grooves 25 which are located axially outside the above-said each of the main oblique grooves 20.

Thereby wet performance can be improved.

Figure 4:
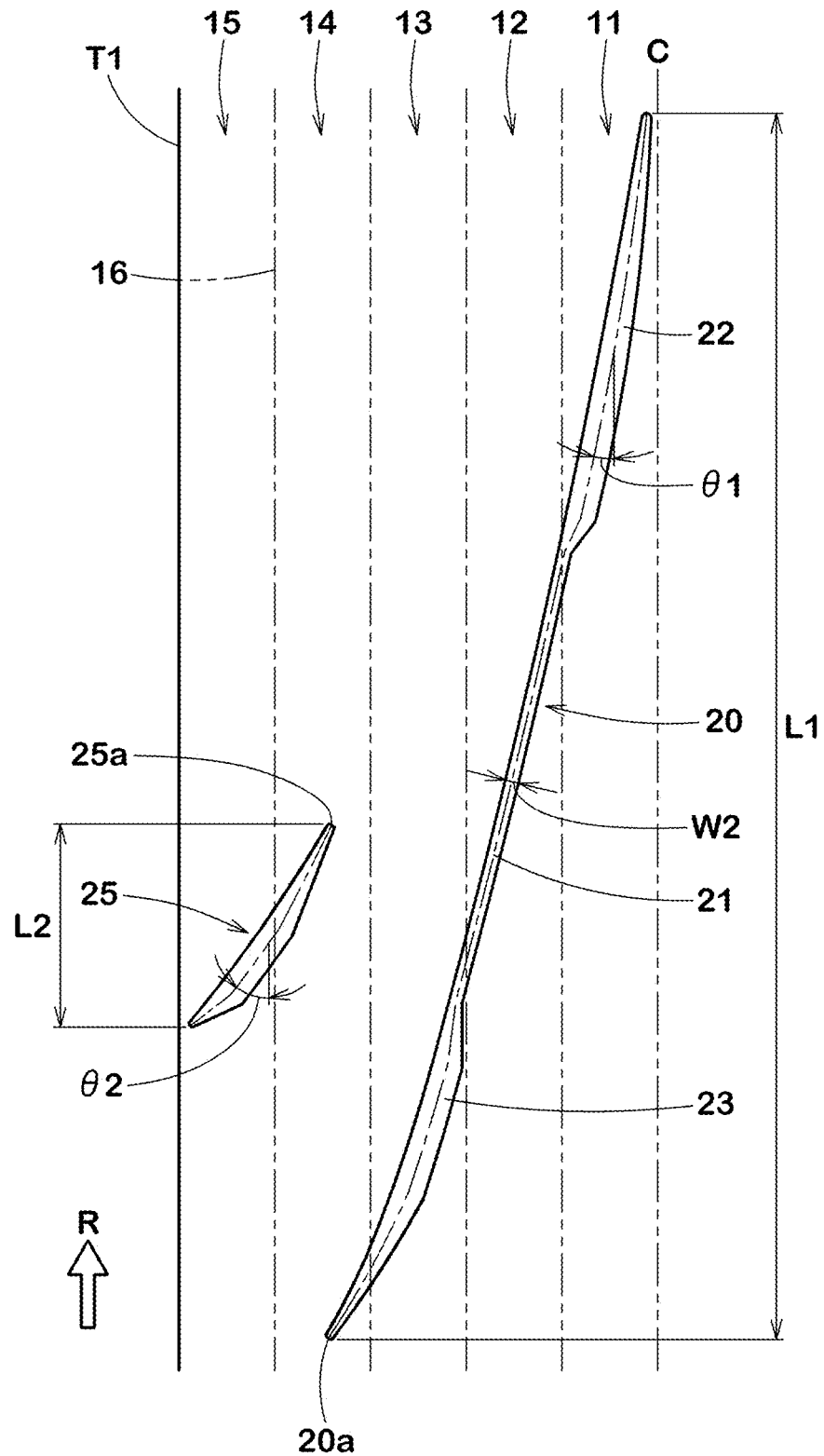
FIG. 4 is an enlarged view showing a main oblique groove and a auxiliary oblique groove shown in FIG. 2.

FIG. 4 is an enlarged view showing one of the main oblique grooves 20 and one of the auxiliary oblique grooves 25.

As shown in FIG. 4, each main oblique groove 20 is inclined toward the opposite direction to the intended rotational direction R while extending from the axially inside toward the axially outside of the tire.

The average inclination angle θ1 of the main oblique groove 20 with respect to the tire circumferential direction is, for example, set in a range from 5 to 10 degrees.

Such main oblique grooves 20 can exhibit excellent drainage performance by utilizing the rotation of the tire when running in wet conditions.

Here, the average inclination angle θ1 corresponds to a value obtained by dividing the groove center line of the main oblique groove 20 into a plurality of minute sections, summing up angles of the minute sections with respect to the tire circumferential direction, and dividing the sum of the angles by the number of the minute sections.

The same applies to average inclination angles appearing in the following description of this specification.

The main oblique groove 20 in this example extends from the first zone 11 to the fourth zone 14 through the second zone 12 and the third zone 13. And the main oblique groove 20 does not exist in the fifth zone 15.

Preferably, the main oblique groove 20 does not extend across the tire equator C.

Preferably, the main oblique groove 20 has a length L1 in the tire circumferential direction which is in a range from 130% to 200% of the above-said one pitch length P1 of the main oblique grooves 20.

The main oblique groove 20 in this example comprises a narrow groove section 21, an inner groove section 22 and an outer groove section 23 in the longitudinal direction of the main oblique groove 20.

The narrow groove section 21 is positioned in a center portion of the main oblique groove 20 in the longitudinal direction, and extends over the entire length with a relatively small constant groove width W2.

The inner groove section 22 is connected to the narrow groove section 21 on the tire equator side, and has a groove width larger than that of the narrow groove section 21.

The outer groove section 23 is connected to the narrow groove section 21 on the first tread edge T1 side, and has a groove width larger than that of the narrow groove section 21.

The constant groove width W2 of the narrow groove section 21 is 3.0 mm or less, preferably 0.5 to 2.5 mm, more preferably 1.0 to 2.0 mm.

Further, an almost entire part of the narrow groove section 21 is located in the second zone 12. More specifically, 80% or more of the opening area of the narrow groove section 21 is located in the second zone 12. Thereby, the land ratio La2 of the second zone 12 is increased, and it becomes possible to achieve the above-described land ratio relationship.

The inner groove section 22 is arranged so that an almost entire part thereof is located in the first zone 11. Specifically, 80% or more, preferably 90% or more, in this example 100% of the opening area of the inner groove section 22 is located in the first zone 11.

The inner groove section 22 has a groove width larger than the narrow groove section 21 as described above. To say this accurately, the average groove width of the inner groove section 22 is larger than the constant groove width W2 of the narrow groove section 21.

Thereby, wet performance during straight running can be ensured.

Here, the average groove width corresponds to a value obtained by dividing the opening area of the inner groove section 22 by the length of the groove center line of the inner groove section 22.

The same applies to average groove widths appearing in the following description of this specification.

The outer groove section 23 is arranged from the third zone 13 into the fourth zone 14, and does not exist in either the second zone 12 or the fifth zone 15.

The average groove width of the outer groove section 23 is larger than the constant groove width W2 of the narrow groove section 21.

Further, 50% or more, preferably 60% or more of the opening area of the outer groove section 23 exists in the third zone 13, and accordingly, the remaining part of the opening area exists in the fourth zone 14. Thereby, the transient characteristics during turning can be improved.

In the main oblique groove 20 in this example,
the axially outer groove edge thereof extends substantially straight or is smoothly slightly curved between the axially outer end 20a and the axially inner end of the main oblique groove 20, and
the axially inner groove edge thereof is bulged out on both sides of the narrow groove section 21, namely, in the inner groove section 22 and the outer groove section 23.

The auxiliary oblique grooves 25 are disposed on the first tread edge T1 side of the main oblique grooves 20.

The auxiliary oblique grooves 25 are inclined in the same direction as the main oblique grooves 20 with respect to the tire circumferential direction in each of the first and second ground contacting surfaces 10A and 10B as shown in FIG. 2.

The average inclination angle θ2 of the auxiliary oblique grooves 25 with respect to the tire circumferential direction is, for example, set in a range from 30 to 50 degrees. Preferably, the average inclination angle θ2 of the auxiliary oblique grooves 25 is larger than the average inclination angle θ1 of the main oblique grooves 20.

This improves stability when turning at a relatively large camber angle where the fourth zone 14 or the fifth zone 15 contacts with the ground.

In the auxiliary secondary oblique groove 25,
the axially outer groove edge thereof extends substantially straight or is smoothly slightly curved between the axially outer end and the axially inner end of the auxiliary secondary oblique groove 25, and the axially inner groove edge thereof is bulged out.

The auxiliary oblique groove 25 is arranged from the fourth zone 14 into the fifth zone 15.

The auxiliary oblique groove 25 does not exist in the third zone 13.

Further, the auxiliary oblique groove 25 is not open at the first tread edge T1. Namely, the auxiliary oblique groove 25 ends without reaching the first tread edge T1.

Preferably, a region which is formed by virtually moving in parallel the auxiliary oblique groove 25 toward the tire equator in the tire axial direction, overlaps with both the narrow groove section 21 and the outer groove section 23 of the axially adjacent main oblique groove 20.

The distance in the tire axial direction between the end 25a on the tire equator C side, of the auxiliary oblique groove 25 and the end 20a on the first tread edge T1 side, of the main oblique groove 20 is preferably 10% or less, more preferably 5% or less of the developed width W1 (shown in FIG. 2) of one of the five zones.

The length L2 in the tire circumferential direction of the auxiliary oblique groove 25 is 10% to 25% of the length L1 in the tire circumferential direction of the main oblique groove 20.

As a result, the transient characteristics during turning may be further improved.

Figure 5:
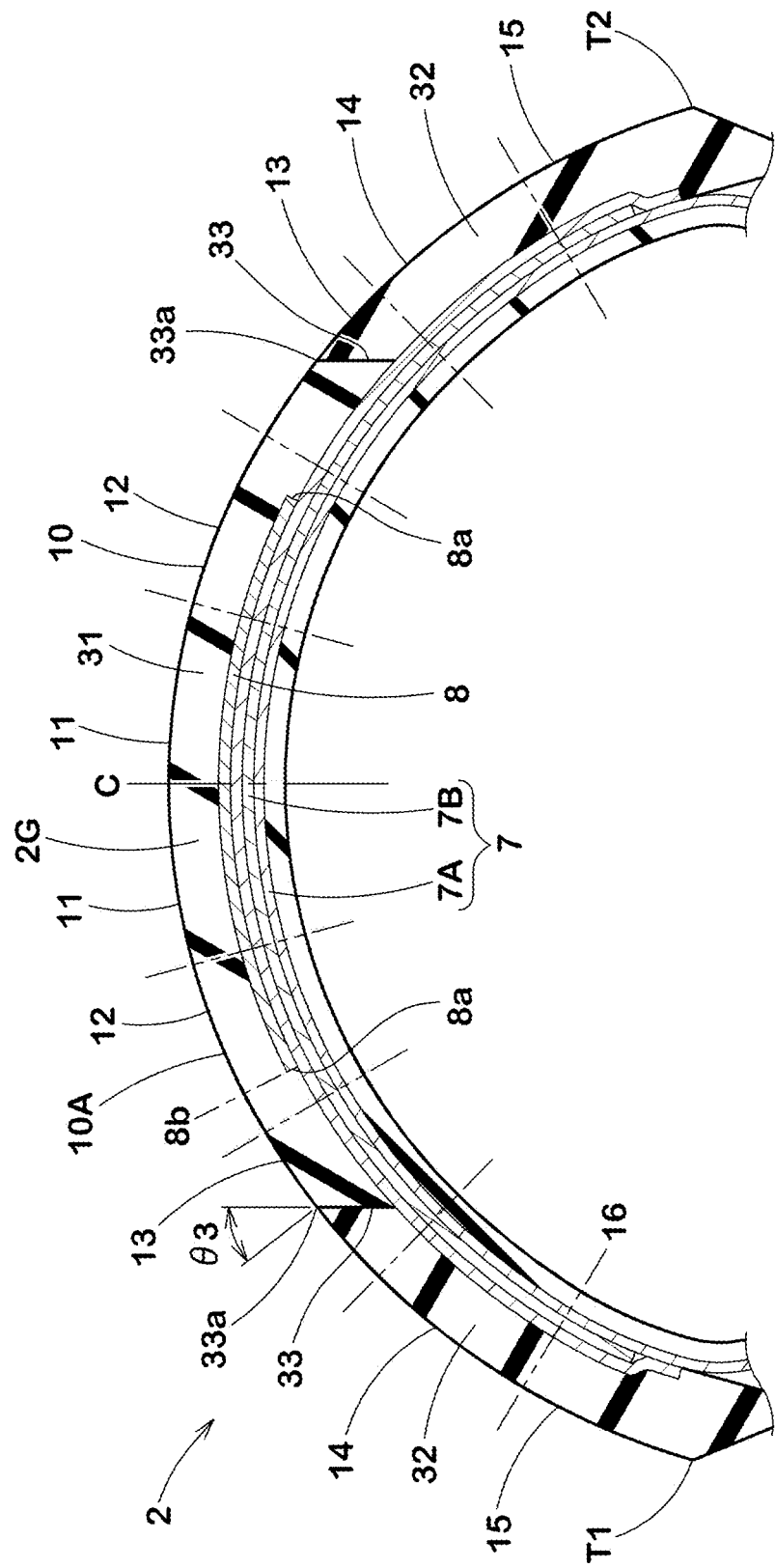
FIG. 5 is a cross-sectional view of the tread portion shown in FIG. 1.

FIG. 5 is a cross-sectional view of the tread portion 2 of FIG. 1.

The tread portion 2 comprises a tread rubber 2G which includes a crown tread rubber 31, and a shoulder tread rubber 32 disposed on each side in the tire axial direction of the crown tread rubber 31 as shown in FIG. 5.

The crown tread rubber 31 and the shoulder tread rubbers 32 are made of different rubber compounds.

The crown tread rubber 31 is disposed so as to extend across the tire equator C.

The two shoulder tread rubbers 32 extend axially outwardly from the crown tread rubber 31 to the first and second tread edges T1 and T2, respectively.

Thereby, the ground contacting surface 10 of the tread portion 2 is formed by the radially outer surfaces of the crown tread rubber 31 and the two shoulder tread rubbers 32.

In each of the first and second ground contacting surfaces 10A and 10B, the boundary surface 33a between the crown tread rubber 31 and the shoulder tread rubber 32 is located axially outside the second zone 12, and preferably located in the third zone 13 or the fourth zone 14.

Thereby, it becomes possible to more effectively suppress the step wear of the tread portion 2.

The crown tread rubber 31 and the shoulder tread rubber 32 have different loss tangent values.

It is preferable that the loss tangent tan δ at 0 degrees C. of the crown tread rubber 31 is larger than the loss tangent tan δ at 0 degrees C. of the shoulder tread rubber 32. This makes it easier to warm the crown tread rubber 31 up to appropriate temperatures at the beginning of running.

It is also preferable that the loss tangent tan δ at 70 degrees C. of the shoulder tread rubber 32 is larger than the loss tangent tan δ at 70 degrees C. of the crown tread rubber 31. This makes it easier to warm the shoulder tread rubber 32 up to appropriate temperatures to exert high road grip performance during cornering.

In this application, the loss tangent tan δ refers to a value measured under the following conditions in accordance with Japanese Industrial Standard (JIS) K6394, using a viscoelastic spectrometer manufactured by Iwamoto Seisakusho KK.

Initial strain: 10%

Amplitude: +/−1%

Frequency: 10 Hz

Deformation mode: tensile

In the cross-sectional view of the tread portion 2, as shown in FIG. 5, the boundary surface 33a in each boundary 33 between the crown tread rubber 31 and the shoulder tread rubber 32 extends linearly, and the boundary surface 33a is inclined at an angle θ3 in a range from 30 to 50 degrees, for example, with respect to the normal direction to the radially outer surface of the tread rubber 2G as shown in FIG. 5.

Further, in the present embodiment, the boundary surface 33a is inclined to the axially inside while extending from the radially inner edge to the radially outer edge of the boundary surface 33a.

The crown tread rubber 31 is disposed on the radially outside of the band layer 8 such that the edges 8a in the tire axial direction of the band layer 8 are positioned axially inside the boundary surfaces 33a, respectively.

In the present embodiment, the boundary surfaces 33a are respectively located in the third zones 13, and a straight line 8b drawn normally to the radially outer surface of the tread rubber 2G passing through each edge 8a of the band layer 8 is located in the second zone 12.

Owing to such arrangement of the band layer 8, it becomes possible to further suppress the step wear of the tread portion 2.

Further, in the present embodiment, the shoulder tread rubber 32 is disposed on the radially outside of the belt layer 7 such that the boundary 33 is located on the radially outside of the belt layer 7, and edges in the tire axial direction of the belt plies 7A and 7B are located axially outside the boundary line between the fourth zone 14 and the fifth zone 15 as shown in FIG. 5.

While detailed description has been made of a motorcycle tire as an embodiment of the present disclosure, the present disclosure can be embodied in various forms without being limited to the illustrated specific embodiment.

STATEMENT OF THE PRESENT DISCLOSURE

The present disclosure is as follows.

Present Disclosure 1

A motorcycle tire comprising a tread portion having a first tread edge, a second tread edge and a ground contacting surface therebetween, the ground contacting surface comprising a first ground contacting surface from a tire equator to the first tread edge, when the first ground contacting surface is divided equally in a developed width direction of the first ground contacting surface into five zones which are a first zone, a second zone, a third zone, a fourth zone and a fifth zone in order from the tire equator to the first tread edge, a land ratio La2 of the second zone is larger than a land ratio La1 of the first zone and larger than a land ratio La3 of the third zone.

Present Disclosure 2

The motorcycle tire according to Present Disclosure 1, wherein
the land ratio La3 of the third zone is larger than the land ratio La1 of the first zone.

Present Disclosure 3

The motorcycle tire according to Present Disclosure 2, wherein
a land ratio La4 of the fourth zone is larger than the land ratio La3 of the third zone, and
a land ratio La5 of the fifth zone is larger than the land ratio La4 of the fourth zone.

Present Disclosure 4

The motorcycle tire according to Present Disclosure 3, wherein
the land ratio La2 of the second zone is largest among the five zones.

Present Disclosure 5

The motorcycle tire according to any one of Present Disclosures 1 to 4, wherein
the land ratio La1 of the first zone is 81% to 91%,
the land ratio La2 of the second zone is 91% to 97%, and
the land ratio La3 of the third zone is 83% to 93%.

Present Disclosure 6

The motorcycle tire according to any one of Present Disclosures 1 to 5, wherein
the first ground contacting surface is formed by a crown tread rubber and a shoulder tread rubber which are made of different rubber compounds, and
in the first ground contacting surface, a boundary between the crown tread rubber and the shoulder tread rubber is positioned on the first tread edge side of the second zone.

Present Disclosure 7

The motorcycle tire according to Present Disclosure 6, wherein
the boundary is located in the third zone or alternatively in the fourth zone.

Present Disclosure 8

The motorcycle tire according to Present Disclosure 6 or 7, wherein
a loss tangent tan δ at 0 degrees C. of the crown tread rubber is larger than a loss tangent tan δ at 0 degrees C. of the shoulder tread rubber.

Present Disclosure 9

The motorcycle tire according to any one of Present Disclosures 6 to 8, wherein
a loss tangent tan δ at 70 degrees C. of the shoulder tread rubber is larger than a loss tangent tan δ at 70 degrees C. of the crown tread rubber.

Present Disclosure 10

The motorcycle tire according to any one of Present Disclosures 1 to 9, wherein
the ground contacting surface comprises a second ground contacting surface from the tire equator to the second tread edge,
when the second ground contacting surface is equally divided in the developed width direction of the second ground contacting surface into five zones which are a first zone, a second zone, a third zone, a fourth zone and a fifth zone in order from the tire equator to the second tread edge, a land ratio La2 of the second zone is larger than a land ratio La1 of the first zone and larger than a land ratio La3 of the third zone in the second ground contacting surface.

DESCRIPTION OF THE REFERENCE SIGNS 2 tread portion
10 ground contacting surface
10A first ground contacting surface
11 first zone
12 second zone
13 third zone
14 fourth zone
15 fifth zone
T1 first tread edge
T2 second tread edge

The invention claimed is:
1. A motorcycle tire comprising a tread portion having a first tread edge, a second tread edge and a ground contacting surface therebetween,
the ground contacting surface comprising a first ground contacting surface from a tire equator to the first tread edge,
when the first ground contacting surface is divided equally in a developed width direction of the first ground contacting surface into five zones which are a first zone, a second zone, a third zone, a fourth zone and a fifth zone in order from the tire equator to the first tread edge,
a land ratio La2 of the second zone is larger than a land ratio La1 of the first zone and larger than a land ratio La3 of the third zone,
the land ratio La3 of the third zone is larger than the land ratio La1 of the first zone,
a land ratio La4 of the fourth zone is larger than the land ratio La3 of the third zone, and
a land ratio La5 of the fifth zone is larger than the land ratio La4 of the fourth zone.
2. The motorcycle tire according to claim 1, wherein the land ratio La2 of the second zone is largest among the five zones.
3. The motorcycle tire according to claim 1, wherein
the land ratio La1 of the first zone is 81% to 91%,
the land ratio La2 of the second zone is 91% to 97%, and
the land ratio La3 of the third zone is 83% to 93%.
4. The motorcycle tire according to claim 1, wherein
the first ground contacting surface is formed by a crown tread rubber and a shoulder tread rubber which are made of different rubber compounds, and
in the first ground contacting surface, a boundary between the crown tread rubber and the shoulder tread rubber is positioned on the first tread edge side of the second zone.

5. The motorcycle tire according to claim 4, wherein the boundary is located in the third zone or alternatively in the fourth zone.

6. The motorcycle tire according to claim 5, wherein a loss tangent tan δ at 0 degrees C. of the crown tread rubber is larger than a loss tangent tan δ at 0 degrees C. of the shoulder tread rubber.

7. The motorcycle tire according to claim 6, wherein a loss tangent tan δ at 70 degrees C. of the shoulder tread rubber is larger than a loss tangent tan δ at 70 degrees C. of the crown tread rubber.

8. The motorcycle tire according to claim 5, wherein a loss tangent tan δ at 70 degrees C. of the shoulder tread rubber is larger than a loss tangent tan δ at 70 degrees C. of the crown tread rubber.

9. The motorcycle tire according to claim 4, wherein a loss tangent tan δ at 0 degrees C. of the crown tread rubber is larger than a loss tangent tan δ at 0 degrees C. of the shoulder tread rubber.

10. The motorcycle tire according to claim 9, wherein a loss tangent tan δ at 70 degrees C. of the shoulder tread rubber is larger than a loss tangent tan δ at 70 degrees C. of the crown tread rubber.

11. The motorcycle tire according to claim 4, wherein a loss tangent tan δ at 70 degrees C. of the shoulder tread rubber is larger than a loss tangent tan δ at 70 degrees C. of the crown tread rubber.

12. The motorcycle tire according to claim 1, wherein the ground contacting surface comprises a second ground contacting surface from the tire equator to the second tread edge, when the second ground contacting surface is divided equally in the developed width direction of the second ground contacting surface into five zones which are a first zone, a second zone, a third zone, a fourth zone and a fifth zone in order from the tire equator to the second tread edge, a land ratio La2 of the second zone is larger than a land ratio La1 of the first zone and larger than a land ratio La3 of the third zone in the second ground contacting surface.

13. A motorcycle tire comprising a tread portion having a pair of tread edges and a half ground contacting surface defined as extending from a tire equator to each of the tread edges, wherein
when the half ground contacting surface is divided equally in a developed width direction of the half ground contacting surface into five zones which are a first zone, a second zone, a third zone, a fourth zone and a fifth zone in order from the tire equator to the one of the tread edges, a land ratio La2 of the second zone is largest among the five zones, the half ground contacting surface is formed by a crown tread rubber and a shoulder tread rubber which are made of different rubber compounds, wherein a loss tangent at 0 degrees C. of the crown tread rubber is larger than a loss tangent at 0 degrees C. of the shoulder tread rubber, and a loss tangent at 70 degrees C. of the shoulder tread rubber is larger than a loss tangent at 70 degrees C. of the crown tread rubber, and a boundary between the crown tread rubber and the shoulder tread rubber in the half ground contacting surface is positioned in the third zone or alternatively in the fourth zone.

14. The motorcycle tire according to claim 13, wherein the boundary between the crown tread rubber and the shoulder tread rubber is positioned in the third zone.

15. The motorcycle tire according to claim 13, wherein a land ratio La3 of the third zone is larger than a land ratio La1 of the first zone.

16. The motorcycle tire according to claim 15, wherein a land ratio La4 of the fourth zone is larger than the land ratio La3 of the third zone.

17. The motorcycle tire according to claim 16, wherein a land ratio La5 of the fifth zone is larger than the land ratio La4 of the fourth zone.

18. The motorcycle tire according to claim 17, wherein the land ratio La1 of the first zone is 81% to 91%, the land ratio La2 of the second zone is 91% to 97%, the land ratio La3 of the third zone is 83% to 93%, the land ratio La4 of the fourth region is 89% to 93%, and the land ratio La5 of the fifth region is 91% to 95%.

* * * * *